United States Patent
Jaradi et al.

(12)

(10) Patent No.: US 11,970,131 B2
(45) Date of Patent: Apr. 30, 2024

(54) LOAD LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 17/681,885

(22) Filed: Feb. 28, 2022

(65) Prior Publication Data

US 2023/0271588 A1    Aug. 31, 2023

(51) Int. Cl.
 *B60R 22/44*    (2006.01)
(52) U.S. Cl.
 CPC ................... *B60R 22/44* (2013.01)
(58) Field of Classification Search
 CPC ............... B60R 22/44; B60R 22/3413; B60R 2022/287
 See application file for complete search history.

(56) References Cited

U.S. PATENT DOCUMENTS

| | | | |
|---|---|---|---|
| 5,967,442 A * | 10/1999 | Wier | B60R 22/3413 280/805 |
| 6,416,008 B1 | 7/2002 | Fujii et al. | |
| 6,648,260 B2 | 11/2003 | Webber et al. | |
| 6,669,133 B2 * | 12/2003 | Palliser | B60R 22/3413 242/379.1 |
| 6,969,022 B2 * | 11/2005 | Bell | B60R 22/3413 280/805 |
| 7,025,297 B2 * | 4/2006 | Bell | B60R 22/3413 242/384 |
| 7,669,794 B2 | 3/2010 | Boelstler et al. | |
| 10,759,381 B2 * | 9/2020 | Jaradi | B60R 22/4676 |

FOREIGN PATENT DOCUMENTS

| | | |
|---|---|---|
| CN | 108238001 A | 7/2018 |
| DE | 29622181 U1 | 12/1996 |

* cited by examiner

*Primary Examiner* — Sang K Kim
(74) *Attorney, Agent, or Firm* — Frank A. MacKenzie; Bejin Bieneman PLC

(57) ABSTRACT

A seatbelt retractor comprises a housing having a first end and a second end. The seatbelt retractor includes a spool having a first end and a second end each rotatably supported by the housing, the spool being elongated on an axis from the first end to the second end. The seatbelt retractor includes a torsion bar having a first end fixed to the first end of the spool and a second end operatively engaged with the housing. The torsion bar includes a wire elongated along the axis and connected to the first end of the torsion bar and the second end of the torsion bar.

20 Claims, 7 Drawing Sheets

LOAD LIMITING SEATBELT RETRACTOR

BACKGROUND

A seatbelt in a vehicle may be equipped with "load-limiting" features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may reduce chest compression.

The function of the load-limiting features is dependent upon the size of the occupant, e.g., the weight and/or height of the occupant. In other words, at a given speed of the vehicle impact, a large occupant may exert a load on the webbing exceeding the load-limiting threshold whereas, at that same speed, the load exerted on the webbing by a small occupant may not exceed the load-limiting threshold.

DETAILED DESCRIPTION

Figure 1:
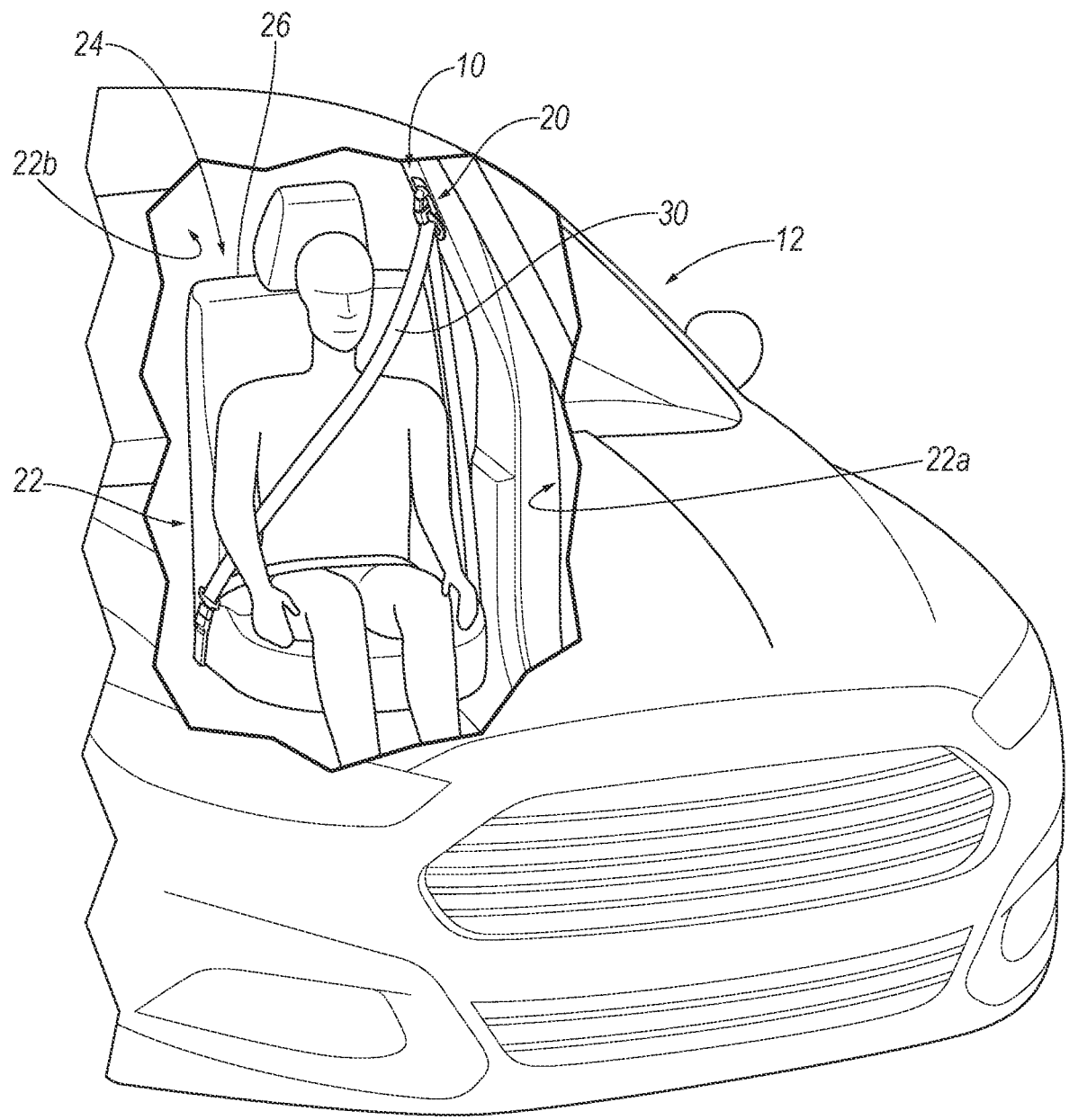
FIG. 1 is a perspective view of a vehicle including a seatbelt assembly.

A seatbelt retractor comprises a housing having a first end and a second end. The seatbelt retractor includes a spool having a first end and a second end each rotatably supported by the housing, the spool being elongated on an axis from the first end to the second end. The seatbelt retractor includes a torsion bar having a first end fixed to the first end of the spool and a second end operatively engaged with the housing. The torsion bar includes a wire elongated along the axis and connected to the first end of the torsion bar and the second end of the torsion bar.

A connection of the wire to the second end may be weaker than a connection of the wire to the first end.

The torsion bar may include a rod elongated from the first end of the torsion bar to the second end of torsion bar, a first cap connected to the rod at the first end of the torsion bar, and a second cap connected to the rod at the second end of the torsion bar, the wire being connected to the first cap and the second cap.

A connection of the wire to the second cap may be weaker than a connection of the wire to the first cap.

The wire may be bonded to the second cap with an adhesive, the failure strength of the adhesive being less than the failure strength of the wire.

The wire and the adhesive may be designed so that the adhesive fails when the first end of the torsion bar rotates 0.5 to 1.0 revolutions about the axis relative to the second end.

The second cap may include a slot receiving the wire, the wire being bonded to the slot with an adhesive, the failure strength of the adhesive being less than the failure strength of the wire.

The seatbelt retractor may include a plurality of wires including the wire, each of the wires being elongated along the axis and connected to the first end of the torsion bar and the second end of the torsion bar.

The plurality of wires may be spaced from each other circumferentially about the axis.

The torsion bar may include a rod elongated from the first end of the torsion bar to the second end of torsion bar, a first cap connected to the rod at the first end of the torsion bar, and a second cap connected to the rod at the second end of the torsion bar, the wires being connected to the first cap and the second cap.

The plurality of wires may be spaced from each other circumferentially about the axis.

A connection of the wires to the second cap may be weaker than a connection of the wires to the first cap.

The wires may be bonded to the second cap with an adhesive, the failure strength of the adhesive being less than the failure strength of the wires.

The wires and the adhesive may be designed so that the adhesive fails when the first end of the torsion bar rotates 0.5 to 1.0 revolutions about the axis relative to the second end.

The second cap may include slots receiving the wires, the wires being bonded to the slots with an adhesive, the failure strength of the adhesive being less than the failure strength of the wires.

The seatbelt retractor may include a webbing supported by the spool.

The seatbelt retractor may include a locking device supported on the second end of the housing and being operatively engaged with the second end of the torsion bar.

The torsion bar may include a rod, the wire and the rod each having a diameter, the diameter of the wire being smaller than the diameter of the rod.

With reference to the Figures, wherein like numerals indicate like parts throughout the several views, a seatbelt retractor 10 is generally shown. The seatbelt retractor 10 for a vehicle 12 includes a housing 14 having a first end 14a and a second end 14b. The seatbelt retractor 10 includes a spool 16 having a first end 16a and a second end 16b each rotatably supported by the housing 14. The spool 16 is elongated on an axis A1 from the first end 16a of the spool 16 to the second end 16b of the spool 16. The seatbelt retractor 10 includes a torsion bar 18 having a first end 18a fixed to the first end 16a of the spool 16 and a second end 18b operatively engaged with the housing 14. The torsion bar 18 includes a wire 20 elongated along the axis from the first end 18a of the torsion bar 18 to the second end 18b of the torsion bar 18. The wire 20 is connected to the first end 18a of the torsion bar 18 and the second end 18b of the torsion bar 18.

The spool 16 rotates in the housing 14. A webbing 30 is supported on the spool 16. Specifically, the webbing 30 is wrapped around the spool 16 and the webbing 30 is paid out from the seatbelt retractor 10 by rotating the spool 16 in the housing 14. Since the torsion bar 18 is fixed to the first end 16a of the spool 16, when the spool 16 rotates, the torsion bar 18 rotates. During use, an occupant of the vehicle 12 exerts an occupant force $F_O$ on the seatbelt retractor 10, i.e., the webbing 30, causing the spool 16 to rotate. The housing 14 restricts rotation of the torsion bar 18 at the second end. Because the housing 14 restricts rotation of the torsion bar 18, the rotation of the spool 16 is restricted. When the occupant force $F_O$ applied to the seatbelt retractor 10 exceeds the threshold force of the wire $F_W$, the wire 20 is disconnected from the second end 18b of the torsion bar 18 to allow the spool 16 to rotate and allow webbing 30 to be paid out.

The vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a frame and a body (not numbered). The frame may be of unibody construction, in which the frame is unitary with the body including frame rails, rockers, pillars, roof rails, etc. As another example, the frame and the body may have any suitable construction. The frame and the body may be of any suitable material, for example, steel, aluminum, and/or fiber-reinforced plastic, etc.

The frame and/or the body defines a passenger compartment 22 to house occupants, if any, of the vehicle 12. The passenger compartment 22 may extend across the vehicle 12, i.e., from one side to the other side of the vehicle 12. The passenger compartment 22 includes a front 22a and a rear 22b. The passenger compartment 22 includes one or more seats 24. The seats 24 may be arranged in any suitable manner in the passenger compartment 22. The seat 24 may include a seatback 26 and a seat bottom (not numbered). The seatback 26 may be supported on the seat bottom and be stationary or movable relative to the seat bottom. The seatback 26 and the seat bottom may be adjustable in multiple degrees of freedom. The seats 24 may be of any suitable type, e.g., a bucket seat as shown in the Figures.

The vehicle 12 includes a seatbelt assembly 28. The seatbelt assembly 28 includes the seatbelt retractor 10 and the webbing 30 retractably payable from the seatbelt retractor 10. The seatbelt assembly 28 may include an anchor (not shown) coupled to the webbing 30, and a clip that engages a buckle (not shown). The seatbelt assembly 28 may be disposed adjacent the seat 24. For example, the seatbelt assembly 28 is adjacent the front seat 24. The seatbelt assembly 28, when fastened, retains the occupant on the seat 24, e.g., during sudden decelerations of the vehicle 12.

The webbing 30 may extend continuously from the seatbelt retractor 10 to the anchor. For example, one end of the webbing 30 feeds into the seatbelt retractor 10, and the other end of the webbing 30 is fixed to the anchor. The anchor may, for example, be fixed to the seat 24. Alternatively, the anchor may be fixed to the vehicle body, e.g., the B-pillar, the floor, etc. The anchor may be attached to the seat 24 in any suitable manner, e.g., with fasteners.

The webbing 30 may be fabric, e.g., woven nylon. The clip slides freely along the webbing 30 and, when engaged with the buckle, divides the webbing 30 into a lap band and a shoulder band.

The seatbelt assembly 28 may be a three-point harness, meaning that the webbing 30 is attached at three points around the occupant when fastened: the anchor, the seatbelt retractor 10, and the buckle. The seatbelt assembly 28 may, alternatively, include another arrangement of attachment points.

The seatbelt retractor 10 may be supported at any suitable location in the vehicle 12. As shown in the Figures, the seatbelt retractor 10 is supported on the frame, e.g. the housing 14 may be fixed to the frame. The seatbelt retractor 10 may be supported on the frame at any suitable location. In other examples, the seatbelt retractor 10 is supported on the seatback 26. Specifically, the housing 14 is fixed to the seatback 26. The housing 14 may be fixed to the seatback 26 in any suitable manner, e.g., a fastener, etc.

As described above, the seatbelt retractor 10 includes the housing 14. The housing 14 has the first end and the second end spaced from the first end along the axis A1. The housing 14 may be of any suitable size and shape. The housing 14 may be of any suitable material, e.g., plastic, metal, composite, etc.

The seatbelt retractor 10 includes a spring 32. The spring 32 may be coupled to the spool 16 and the housing 14. In the example shown in the FIGS. 2-3, the spring 32 is disposed at the first end 14a of the housing 14. Specifically, the spring 32 is engaged with the first end 16a of the spool 16 to retract the webbing 30. The spring 32 may be loaded in tension or compression when the webbing 30 is fully retracted, and the spring 32 may be further loaded in either tension or compression when the webbing 30 is extended from the spool 16. When the occupant force $F_O$ is exerted on the webbing 30, the spring 32 uncoils and the webbing 30 is paid out from the spool 16. When the occupant force $F_O$ applied to the webbing 30 is released, no rotational force is exerted on the spool 16 and the spring 32 exerts a force tending to retract the webbing 30. The spring 32 may be, for example, a spiral torsion spring 32 or any other suitable type of spring 32.

Figure 2:
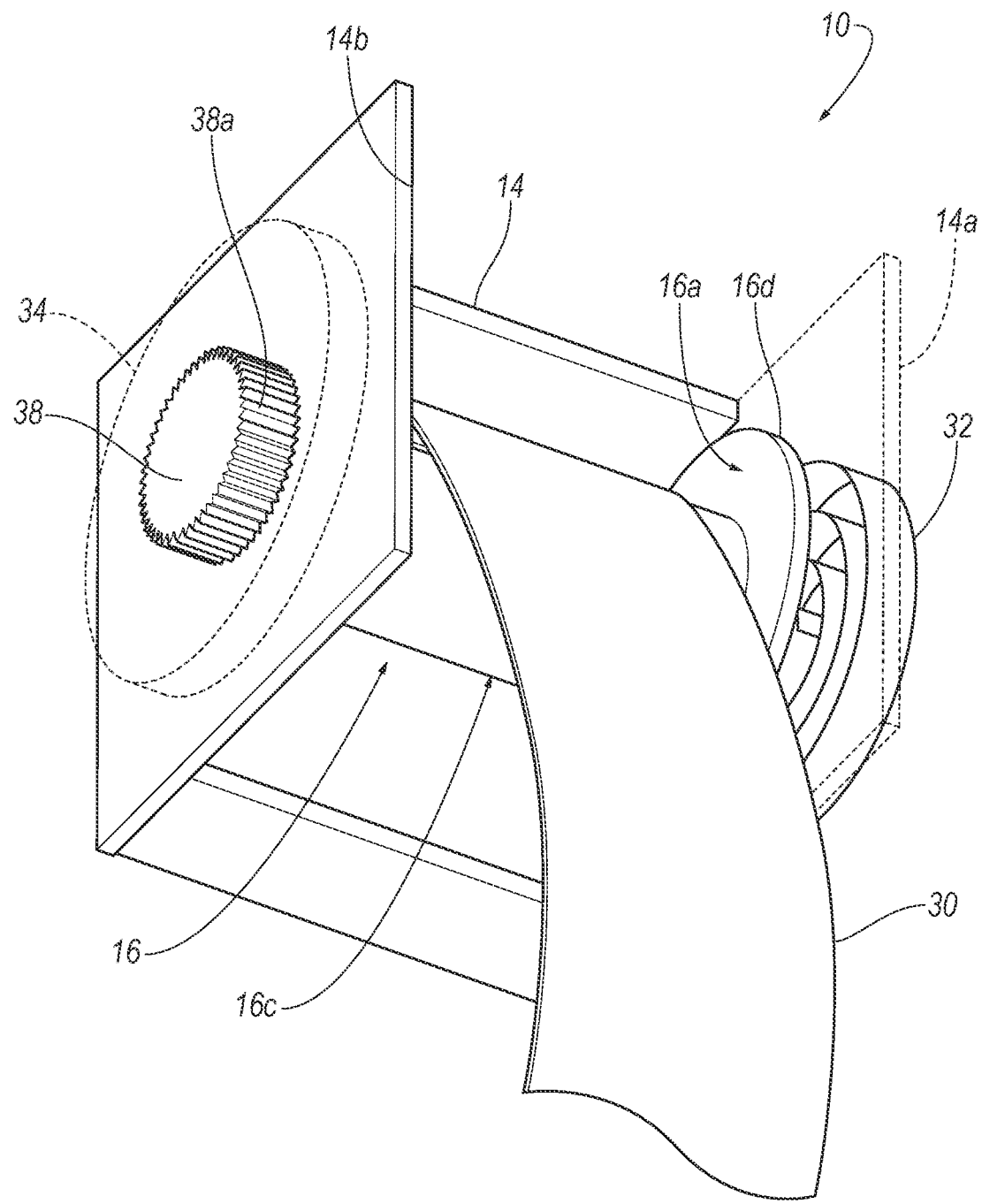
FIG. 2 is a perspective view of a seatbelt retractor.
Figure 3:
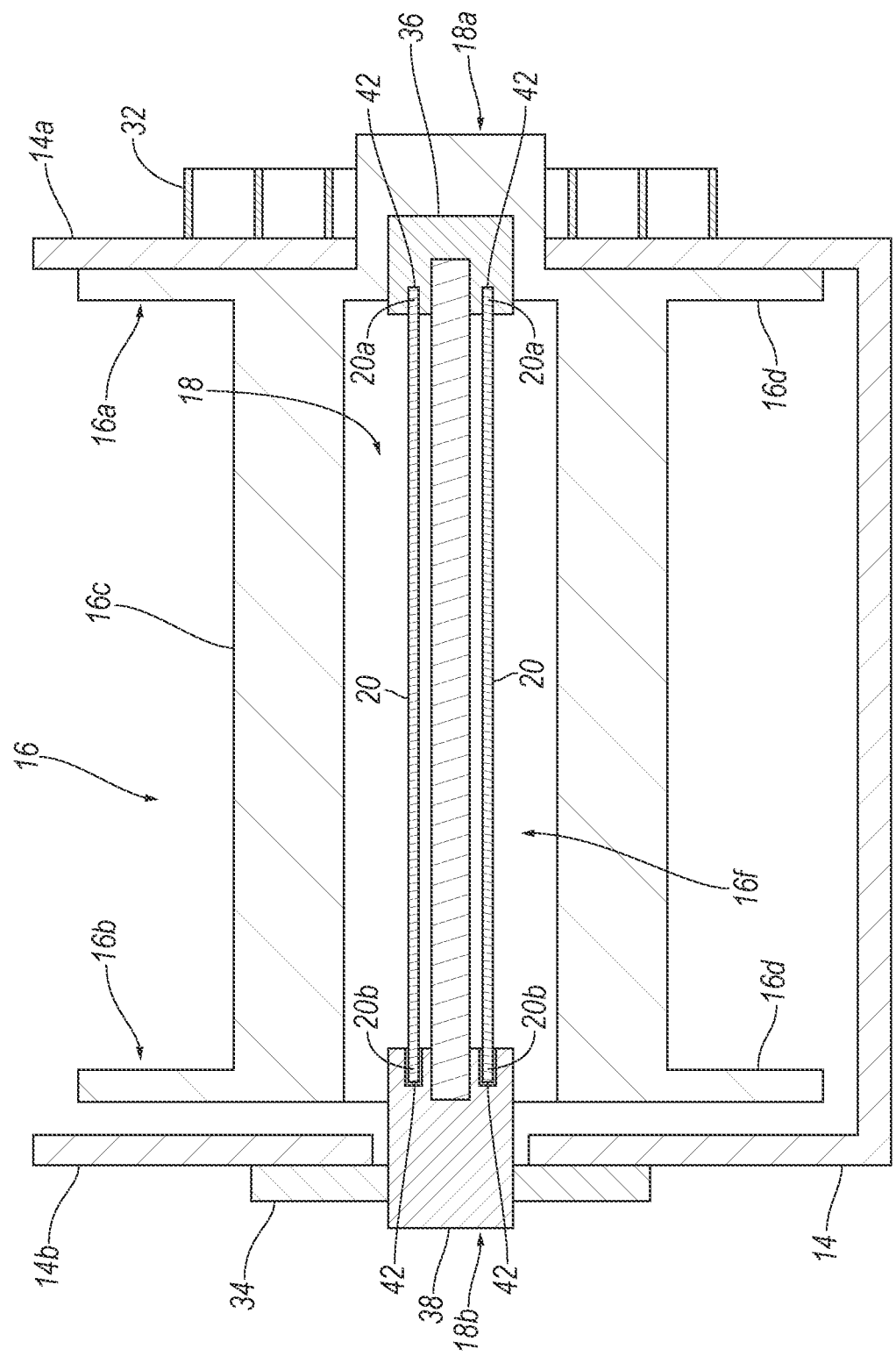
FIG. 3 is a cross-sectional view of the seatbelt retractor.
Figure 4:
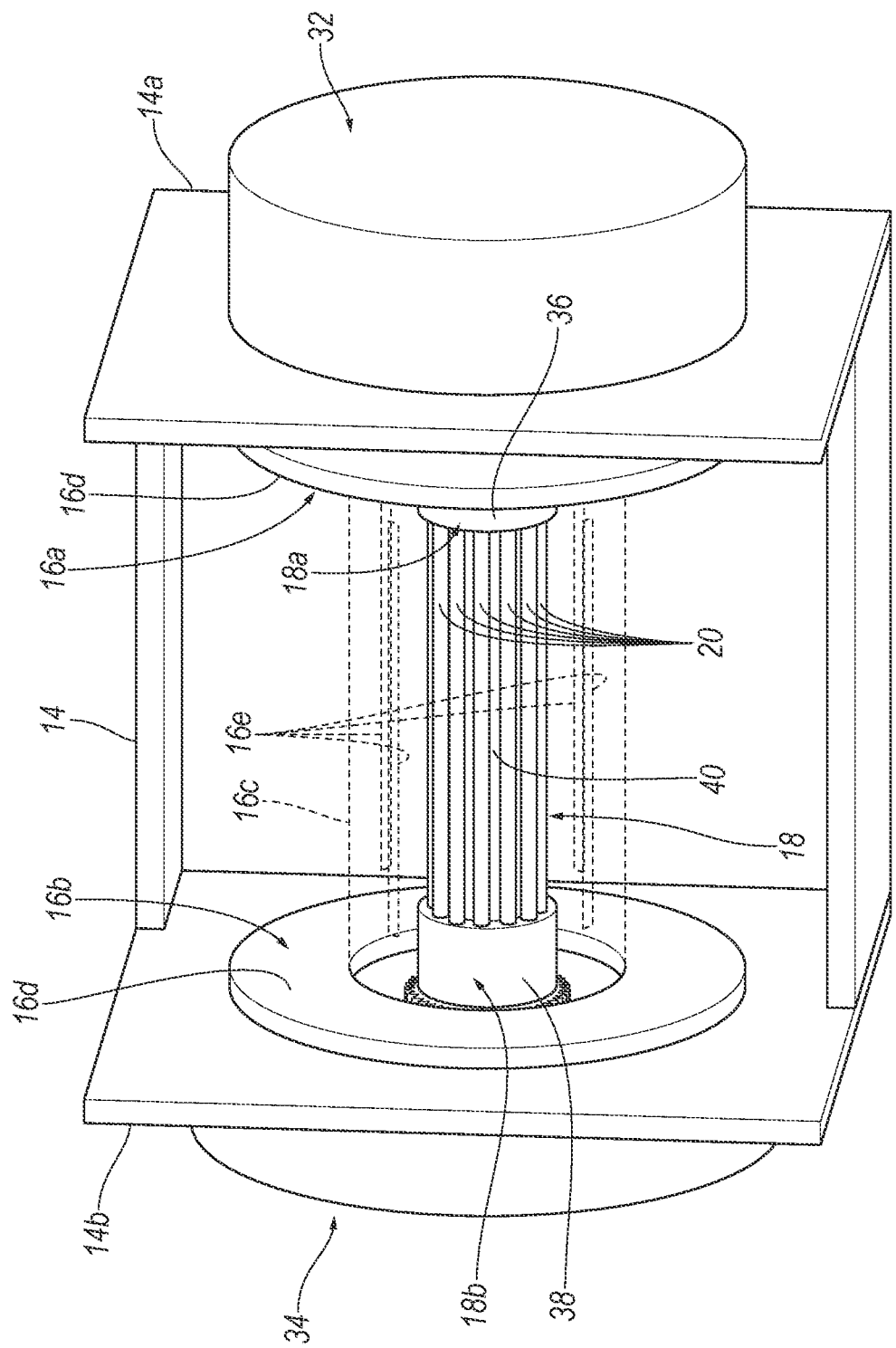
FIG. 4 is a perspective view of the seatbelt retractor.

The seatbelt retractor 10 includes a locking device 34. As shown in FIG. 2, the locking device 34 is supported on the second end 14b of the housing 14. Specifically, the locking device 34 is coupled to the second end 14b of the housing 14 in any suitable manner, e.g., fasteners. The locking device 34 is engaged with the torsion bar 18 to restrict movement of the webbing 30. The locking device 34 is anchored to the housing 14 and is moveable relative to the torsion bar 18 between a locked position and an unlocked position. In the unlocked position, the locking device 34 allows rotation of an end of the torsion bar 18 relative to the housing 14 and, in the locked position, the locking device 34 prevents rotation of that end of the torsion bar 18 relative to the housing 14. Specifically, the torsion bar 18 may include a first cap 36 and a second cap 38, described below, and in such an example the locking device 34 is operatively engaged with the second cap 38 when the locking device 34 is in the locked position.

The locking device 34 may be triggered in any suitable manner. As one example, the locking device 34 may engage the torsion bar 18 in response to deceleration of the vehicle 12, e.g., a sudden slowing of the vehicle 12, sudden stop, vehicle impact, etc. In other words, the locking device 34 may be moved from the unlocked position to the locked position by a change in inertia. The locking device 34 may engage the torsion bar 18 in response to an activation sensor (not shown). The activation sensor senses sudden deceleration of the vehicle 12 and triggers activation of the locking device 34, i.e., moves the locking device 34 to the locked position. As one example, the activation sensor may be in the seatbelt retractor 10 and may be, for example, a weighted pendulum, a centrifugal clutch, or any other suitable type. In other examples, the activation sensor may be in the vehicle 12 outside the seatbelt retractor 10 and in such examples the activation sensor may be, for example, post-contact sensors such as accelerometers, pressure sensors, and contact switches; pre-impact sensors such as radar, lidar, and vision-sensing systems, or any other suitable type. The vision systems may include one or more cameras, CCD image sensors, CMOS image sensors, etc.

As an example, the locking device 34 may include a bar (not shown) supported on the housing 14. In this example the bar moves away from the axis A1. As described below, the torsion bar 18 includes the second cap 38, and the second cap 38 may include a plurality of teeth 38a. The bar and the teeth 38a may be engaged in the locked position to restrict rotation of the torsion bar 18 relative the housing 14. When the bar is engaged with the teeth 38a, the torsion bar 18 can rotate in one direction, e.g., to retract the webbing 30, and is restricted from rotating in the other direction, e.g., to pay out the webbing 30. Alternatively, the locking device 34 may be any conventional locking device 34 for a seatbelt retractor 10 known in the art.

The seatbelt retractor 10 includes the spool 16. The spool 16 is elongated along the axis A1 from the first end to the second end. The spool 16 is rotatably supported by the housing 14. Specifically, the first end and the second end 16b of the spool 16 are each rotatably supported by the housing 14. The spool 16 is rotatable about the axis A1 when the locking device 34 is in the unlocked position.

The first end 16a of the spool 16 is adjacent the first end 14a of the housing 14. The first end 16a of the spool 16 is fixed to the torsion bar 18, i.e., when the spool 16 rotates, the torsion bar 18 rotates. The second end 16b of the spool 16 is adjacent the second end 14b of the housing 14. The second end 16b of the spool 16 is radially spaced from the torsion bar 18.

The spool 16 may include a cylinder 16c and two flanges 16d. As an example, shown in the figures, the spool 16 includes one flange 16d at the first end 16a of the spool 16 and the other flange 16d at the second end 16b of the spool 16. The cylinder 16c is elongated from one flange 16d to the other flange 16d. The flanges 16d maintain the position of the webbing 30 relative to the spool 16, i.e., the webbing 30 is between the flanges 16d. As shown in the Figures, the flanges 16d extend radially away from the axis A1.

The webbing 30 supported by the spool 16. Specifically, the webbing 30 is supported on the cylinder 16c between the two flanges 16d. As an example, shown in the Figures, the cylinder 16c includes slots 16e. As shown in the Figures, the slots 16e are elongated along the axis A1. The slots 16e are sized and shaped to receive the webbing 30. The webbing 30 may be in the slots 16e and wound around the spool 16. The webbing 30 may be, for example, fixed to the spool 16 through the slots 16e. The webbing 30 may be fixed to the spool 16 in any suitable manner.

The spool 16 includes a cavity. In examples with the cylinder 16c, the cylinder 16c defines the cavity, i.e., the cylinder 16c is hollow. The torsion bar 18 is disposed in the cavity. As described below, the torsion bar 18 extends along the axis A1 through the cavity. The spool 16 surrounds the torsion bar 18. The spool 16 may be of any suitable material, e.g., plastic, metal, composite, etc.

The seatbelt retractor 10 includes the torsion bar 18. The torsion bar 18 is elongated from the first end 18a of the torsion bar 18 to the second end 18b of the torsion bar 18. Specifically, the torsion bar 18 is elongated along the axis A1. The first end and the second end 18b of the torsion bar 18 are operatively engaged with the housing 14, directly or indirectly.

As described above and shown in the Figures, the first end 18a of the torsion bar 18 is operatively engaged with the housing 14 indirectly. Specifically, the first end 18a of the torsion bar 18 is fixed to the first end 16a of the spool 16, and the first end 16a of the spool 16 is operatively engaged with the spring 32. As described above, the spring 32 is coupled to the housing 14 and the spool 16, thus when the spool 16 rotates and exerts a force on the spring 32, the spring 32 exerts a force on the housing 14. The first end 18a of the torsion bar 18 may be fixed to the first end 16a of the spool 16 in any suitable manner, e.g., welding, adhesive, etc.

As described above and shown in the Figures, the second end 18b of the torsion bar 18 is operatively engaged with the housing 14 directly. Specifically, the second end 18b of the torsion bar 18 is operatively engaged with the locking device 34 in the locked position. In other words, when the locking device 34 moves from the unlocked position to the locked position, the torsion bar 18 engages the locking device 34 and restricts rotation of the spool 16.

The torsion bar 18 is designed to rotationally yield, e.g., plastically deform, as the torsion bar 18 is rotated by the spool 16 when fixed by the locking device 34. Specifically, the torsion bar 18 is designed to yield at the threshold force of the rod $F_R$ and the threshold force of the wire $F_W$. As described further below, the torsion bar 18 includes a rod 40 and a plurality of wires 20 including the wire 20. The rod 40 is designed to yield at the threshold force of the rod $F_R$ and the plurality of wires 20 are designed to yield at the threshold force of the wire $F_W$.

As shown in the Figures, the torsion bar 18 includes the rod 40, the first cap 36, the second cap 38, and the wire 20. The rod 40 is elongated from the first end 18a of the torsion bar 18 to the second end 18b of the torsion bar 18. The first cap 36 is fixed to the rod 40 at the first end 18a of the torsion bar 18 and the second cap 38 is fixed to the rod 40 at the second end 18b of the torsion bar 18. The torsion bar 18 may include the plurality of wires 20, including the wire 20. As shown in the figures, the plurality of wires 20 are elongated from the first cap 36 to the second cap 38. As described below, the plurality of wires 20 are connected to the first cap 36 and the second cap 38. The plurality of wires 20 are spaced radially from the rod 40 and arranged circumferentially about the axis A1.

The torsion bar 18 includes the first cap 36 and the second cap 38. The first cap 36 and the second cap 38 may be engaged with the housing 14, directly or indirectly. In the example shown in the figures, the first cap 36 is fixed to the spool 16 and the spool 16 is operatively engaged with the spring 32. When the webbing 30 is retracted by the seatbelt retractor 10, the spring 32 coils to rotate the spool 16. Specifically, the spring 32 exerts a rotational force on the first cap 36 and because the torsion bar 18 is connected to the spool 16, the spool 16 rotates. In the example shown in the figures, the second cap 38 is indirectly engaged with the second end 14b of the housing 14. Specifically, the second cap 38 is operatively engaged with the locking device 34. When the locking device 34 is in the locked position, the locking device 34 acts on the second cap 38 to restrict rotation of the torsion bar 18 and the spool 16.

The first cap 36 and the second cap 38 may each have teeth 36a, 38a. As an example, shown in the Figures, the teeth 36a, 38a are arranged circumferentially on the first cap 36 and the second cap 38 about the axis A1. As described above, the first cap 36 may be engaged with the spool 16 and the second cap 38 may be engaged with the locking device 34. Specifically, the teeth 36a, 38a may be engaged with the locking device 34 and the spool 16. As an example, when webbing 30 is paid out the spool 16 rotates. In such an example, the teeth 36a are engaged with the spool 16 and the spool 16 rotates the torsion bar 18. As another example, when the locking device 34 is engaged with the torsion bar 18, the locking device 34 engages the teeth 38a of the second cap 38 to restrict rotation of the torsion bar 18. The first cap 36 and the second cap 38 may be designed to be engaged with the spool 16 and/or the locking device 34 in any suitable manner. The first cap 36 and the second cap 38 may engage the spool 16 and/or the locking device 34 in the same manner or in a different manner.

The first cap 36 and the second cap 38 may each have slots 42. The slots 42 receive the wire 20. Specifically, the slots 42 of the first cap 36 and the slots 42 of the second cap 38 each receive the wire 20. In examples with the plurality of wires 20, the slots 42 receive the plurality of wires 20. Specifically, the number of slots 42 in the first cap 36 and the second cap 38 correspond to at least the number of wires 20. As one example, the torsion bar 18 may have four wires 20 and each of the first cap 36 and the second cap 38 have four slots 42. As another example, the torsion bar 18 may have four wires 20 and each of the first cap 36 and the second cap 38 have more than four slots 42.

The slots 42 are designed, i.e., sized and shaped, to receive the wire 20. As shown in the Figures, the slots 42 may be recessed cylinder 16cs in the first cap 36 and the second cap 38. As an example, the slots 42 may be sized and shaped to receive the wire 20 and a bonding agent 44. As another example shown in the Figures, the slots 42 may be sized and shaped to receive the wire 20 without a bonding agent, e.g., press fitting. As shown in the Figures, the slots 42 in the first cap 36 may be of a different size or shape than the slots 42 in the second cap 38. In other examples, the slots 42 in the first cap 36 and the second cap 38 may be of the same size and shape.

The torsion bar 18 includes the rod 40. As shown in the Figures, the rod 40 is elongated along the axis A1 from the first end 18a of the torsion bar 18 to the second end 18b of the torsion bar 18. Specifically, the rod 40 is elongated along the axis A1 from the first cap 36 to the second cap 38. The rod 40 is fixed to the first cap 36 and the second cap 38 in any suitable manner, e.g., welding, press fit, bonding agent, etc.

The rod 40 has a diameter D1. As shown in the example in the Figures, the rod 40 is generally cylindrical. In other examples, the rod 40 may be square, i.e., have a square cross-section, or be of any suitable shape. The rod 40 may be of any suitable size, shape, material, etc. that resists rotational yield below the threshold force of the rod $F_R$.

The rod 40 is designed to rotationally yield at the threshold force of the rod $F_R$. Specifically, the rod 40 is designed to plastically deform as the rod 40 is rotated by the spool 16 at the first end and locked by the locking device 34 at the second end. When the torsion bar 18 is locked by the locking device 34, the rod 40 resists rotation of the spool 16 unless the rotational force exceeds the threshold force of the rod $F_R$.

In the example shown in the Figures, the torsion bar 18 includes the plurality of wires 20, including the wire 20. The wire 20 is connected to the first end 18a of the torsion bar 18 and the second end 18b of the torsion bar 18. As described herein, the description of the wire 20 is applicable to each of the plurality of wires 20. For example, the wire 20 has a first end 20a and a second end 20b, thus each of the plurality of wires 20 has a first end 20a and a second end 20b.

The wire 20 is elongated from the first end to the second end along the axis A1. Specifically, the wire 20 is elongated from the first cap 36 to the second cap 38. The wire 20 has a diameter D2. The diameter D2 is smaller than the diameter D1. In the example shown in the Figures including the plurality of wires 20, the plurality of wires 20 are arranged circumferentially about the rod 40. Specifically, the plurality of wires 20 are spaced from each other circumferentially about the axis A1.

As set forth above, the wire 20 is connected to the first end 18a of the torsion bar 18 and the second end 18b of the torsion bar 18. Specifically, the first end 20a of the wire 20 is connected to the first cap 36 and the second end 20b of the wire 20 is connected to the second cap 38. As one example, the plurality of wires 20 may be fixed to the first cap 36 and/or the second cap 38, e.g., press fit, welded, etc. As shown in the Figures, the first end 20a of the wires 20 are fixed to the first cap 36. As another example, shown in the Figures, the plurality of wires 20 may be bonded to the first cap 36 and/or the second cap 38, e.g., adhesively bonded. As shown in the Figures, the second end 20b of the wires 20 are bonded to the second cap 38.

In the examples shown in the Figures, the first end 20a of the wire 20 is fixed to the slots 42 of the first cap 36 and the second end 20b of the wire 20 is bonded to the slots 42 of the second cap 38. In these examples, the wire 20 is welded to the first cap 36 and adhesively bonded to the second cap 38. As another example, the first cap 36 and the second cap 38 may be bonded in the same manner. In this example the wire 20 may be, for example, adhesively bonded to the first cap 36 and adhesively bonded to the second cap 38, the adhesive bond between the wire 20 and the first cap 36 being stronger than the adhesive bond between the wire 20 and the second cap 38. The failure strength of the adhesive, i.e., the bond, is less than the failure strength of the wire 20. The bond between the wire 20 and the slot 42 will yield at a lower threshold rotational force than the wire 20 itself. In other words, the bond between the wire 20 and the slot 42 will break before the wire 20 breaks.

Figures 5A, 5B:
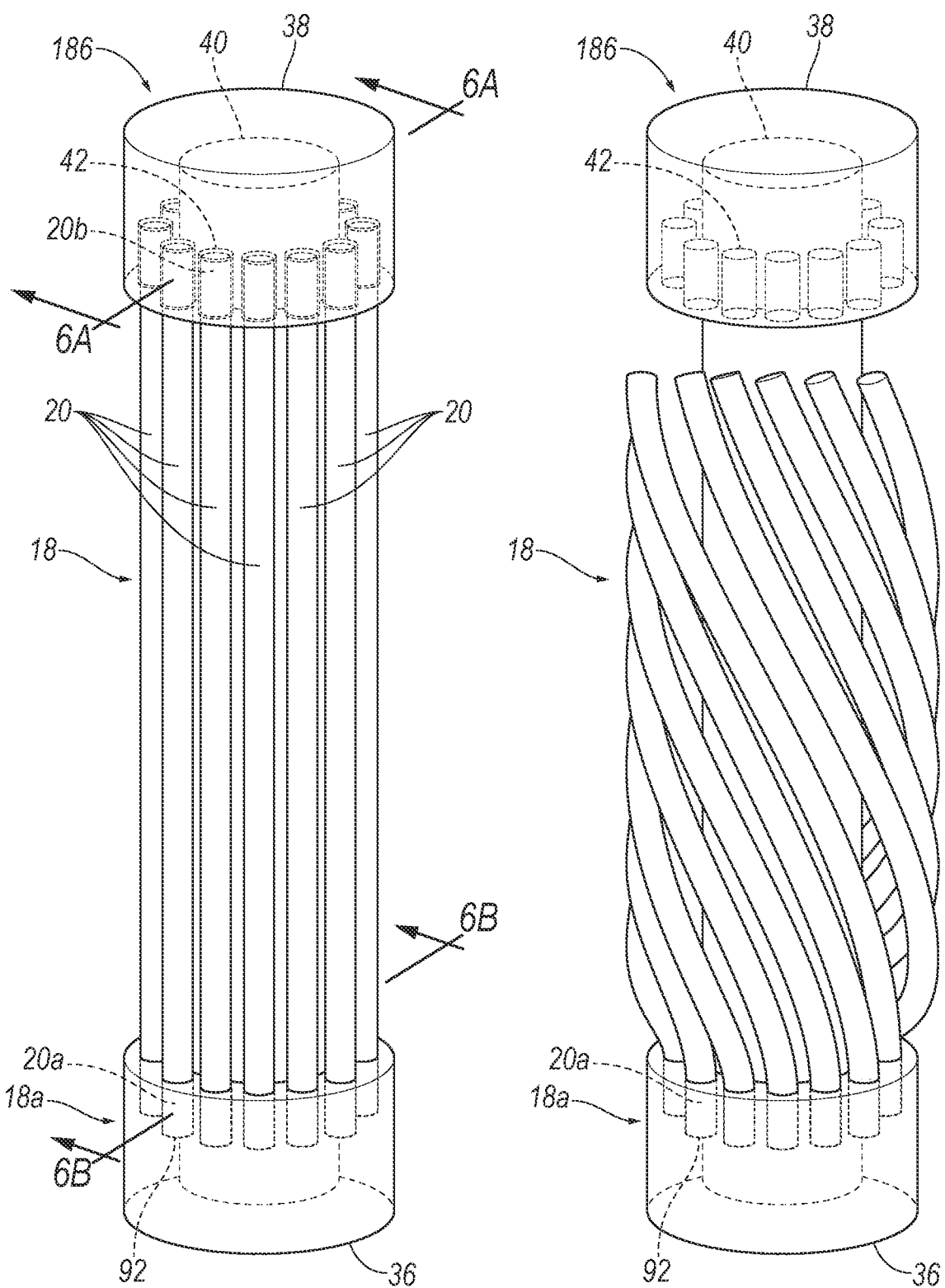
FIG. 5A is an isolated view of a torsion bar.
FIG. 5B is an isolated view of the torsion bar after a threshold force has been applied to the torsion bar.
Figure 6A:
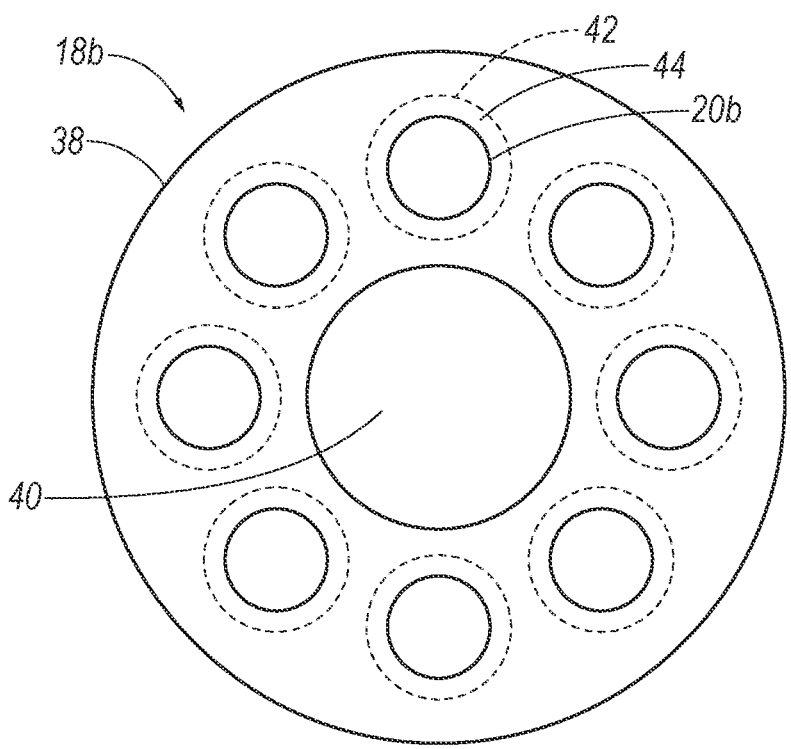
FIG. 6A is a cross-sectional view of a second cap of the torsion bar.
Figure 6B:
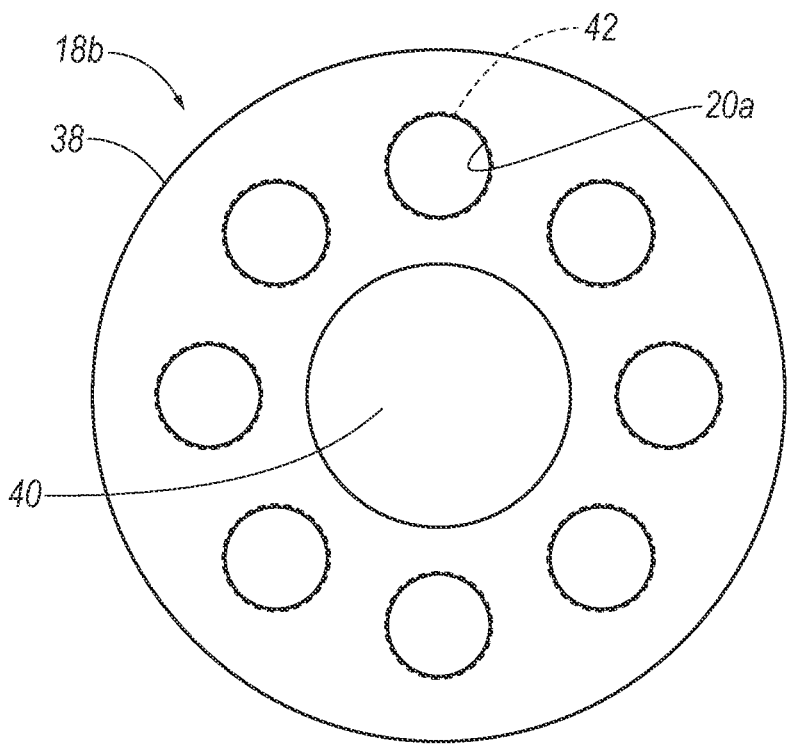
FIG. 6B is a cross-section view of a first cap of the torsion bar.

The connection of the wire 20 to the second cap 38 is weaker than the connection of the wire 20 to the first cap 36. As shown in FIG. 5B, the connection between the wire 20 and the slot 42 of the second cap 38 is designed to fail before the connection between the wire 20 and the slot 42 of the first cap 36. The wire 20 and the adhesive are designed so that the adhesive fails when the torsion bar 18 is subjected to the threshold rotational force of the wire $F_W$. As shown in the Figures, the threshold rotational force of the wire $F_W$ is met when the torsion bar 18 is locked by the locking device 34, and the first end 18a of the torsion bar 18 rotates 0.5 to 1.0 revolutions about the axis relative to the second end. Specifically, the wire 20 and the adhesive are designed so that the adhesive fails when the first end 18a of the torsion bar 18 rotates 0.5 to 1.0 revolutions about the axis relative to the second end. As shown in FIGS. 5A-5B, when the second end 18b of the torsion bar 18 is locked, the webbing 30 can exert the occupant force $F_O$ on the spool 16 to rotate the first end 18a of the torsion bar 18. As the torsion bar 18 rotates, the plurality of wires 20 helically twist relative to the rod 40. When the first end 18a of the torsion bar 18 rotates 0.5 to 1.0 revolutions about the axis relative to the second end, the bond between the second end 20b of the wire 20 and the slots 42 in the second cap 38 fail, i.e., come apart. The threshold rotational force of the wire $F_W$ is higher than the threshold rotational force of the rod $F_R$.

Figure 7:
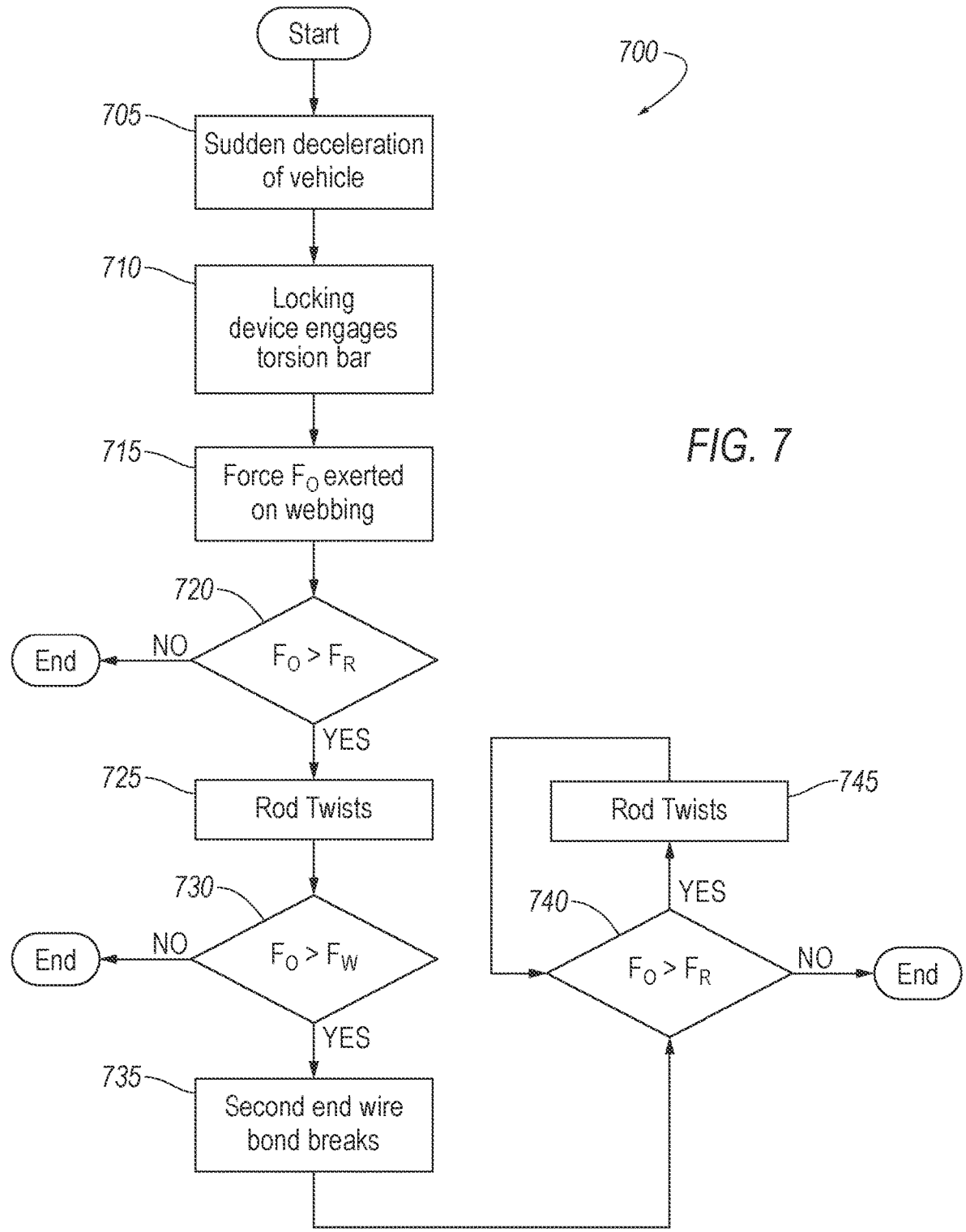
FIG. 7 is a block diagram of the operation of the torsion bar in response to an occupant force $F_O$.

As an example, during a frontal vehicle impact the occupant is urged away from the seat toward the front 22a of the passenger compartment 22. As shown in FIG. 7, when the occupant is properly seated in the seat 24 with the restraint system in use, the occupant's movement toward the front 22a of the passenger compartment 22 exerts the occupant force $F_O$ on the webbing 30. As described above, the locking device 34 may engage the torsion bar 18 in response to deceleration of the vehicle 12 as shown in block 705. When the locking device 34 engages the torsion bar 18, additional payout of the webbing 30 is restricted as shown in block 710. If the occupant force $F_O$ exceeds the threshold force of the rod $F_R$, as shown in block 720, the rod 40 twists, i.e., plastically deforms, allowing additional payout of the webbing 30 as shown in block 725. Upon the occupant force $F_O$ exceeding the threshold force of the rod $F_R$, the torsion bar 18 continues to rotate, twisting the wires 20 and allowing additional payout of the webbing 30. If the occupant force $F_O$ exceeds the threshold force of the wire $F_W$, as shown in block 730, i.e., 0.5 to 1.0 revolutions of the spool 16, the bonds between the wires 20 and the second cap 38 break, as shown in block 735. While the occupant force $F_O$ exceeds the threshold force of the rod $F_R$, as shown in block 740, the torsion bar 18 continues to rotate, i.e., the rod twists, as shown in block 745 and permits payout of the webbing 30. In other words, the seatbelt retractor 10 is a digressive load-limiting retractor with the combination of the torsion bar 18 and the wire(s) 20 providing a first level of load-limiting and with the torsion bar 18 providing a subsequent, lower level of load-limiting after the wire(s) 20 release from the second cap 38. The occupant force $F_O$ may drop below the threshold force of the rod $F_R$, for example, when the occupant's forward movement is interrupted, e.g., by an airbag. Specifically, when the occupant's forward movement is interrupted, the occupant force $F_O$ on the webbing 30 may be reduced.

As shown in the Figures, the seatbelt retractor 10 includes the housing 14, the spool 16, and the torsion bar 18. The seatbelt retractor 10 provides payout and retraction of the webbing 30, e.g., to adjust a length of the webbing 30 to accommodate various sized occupants. The seatbelt retractor 10 may be designed to selectively restrict payout of the webbing 30, e.g., during a vehicle impact.

As an example, during a vehicle impact the seatbelt retractor 10 restricts payout of the webbing 30 to restrict movement of the occupant away from the seat 24. The occupant may be urged away from the seat 24 in response to a sudden deceleration of the vehicle 12. When the occupant is urged away from the seat 24, the occupant exerts the occupant force $F_O$ on the webbing 30 and the seatbelt retractor 10. The seatbelt retractor 10 has the locking device 34. The locking device 34 may engage the torsion bar 18 in response to the sudden deceleration of the vehicle 12. When the locking device 34 is in the locked position, the seatbelt retractor 10 restricts payout of the webbing 30. Specifically, the seatbelt retractor 10 includes the torsion bar 18. The torsion bar 18 includes the rod 40 and the wires 20. When the occupant force $F_O$ on the webbing 30 and the seatbelt retractor 10 meets or exceeds the threshold force of the rod $F_R$ and/or the threshold force of the wire $F_W$, the torsion bar 18 plastically deforms and permits additional webbing 30 to be paid out from the seatbelt retractor 10, until the occupant force $F_O$ no longer exceeds the threshold force of the rod $F_R$.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt retractor comprising:
a housing having a first end and a second end;
a spool having a first end and a second end each rotatably supported by the housing, the spool being elongated on an axis from the first end to the second end; and
a torsion bar having a first end fixed to the first end of the spool and a second end operatively engageable with the housing;
the torsion bar having a rod elongated from the first end of the torsion bar to the second end of the torsion bar, the torsion bar being designed to rotationally yield so that the first end of the torsion bar rotates relative to the second end of the torsion bar when the second end of the torsion bar is engaged with housing and rotational force applied to the torsion bar through the spool exceeds a threshold force of the rod; and
the torsion bar including a wire elongated along the axis and connected to the first end of the torsion bar and the second end of the torsion bar, the wire being designed to deform about the axis and to release from the rod during the rotation of the first end of the rod relative to the second end of the rod.

2. The seatbelt retractor of claim 1, wherein a connection of the wire to the second end is weaker than a connection of the wire to the first end.

3. The seatbelt retractor of claim 1, wherein the torsion bar includes a first cap connected to the rod at the first end of the torsion bar and a second cap connected to the rod at the second end of the torsion bar, the wire being connected to the first cap and the second cap.

4. The seatbelt retractor of claim 3, wherein a connection of the wire to the second cap is weaker than a connection of the wire to the first cap.

5. The seatbelt retractor of claim 3, wherein the wire is bonded to the second cap with an adhesive, the failure strength of the adhesive being less than the failure strength of the wire.

6. The seatbelt retractor of claim 5, wherein the wire and the adhesive are designed so that the adhesive fails when the first end of the torsion bar rotates 0.5 to 1.0 revolutions about the axis relative to the second end.

7. The seatbelt retractor of claim 3, wherein the second cap includes a slot receiving the wire, the wire being bonded to the slot with an adhesive, the failure strength of the adhesive being less than the failure strength of the wire.

8. The seatbelt retractor of claim 1, further comprising a plurality of wires including the wire, each of the wires being elongated along the axis and connected to the first end of the torsion bar and the second end of the torsion bar.

9. The seatbelt retractor of claim 8, wherein the plurality of wires are spaced from each other circumferentially about the axis.

10. The seatbelt retractor of claim 8, wherein the torsion bar includes a first cap connected to the rod at the first end of the torsion bar and a second cap connected to the rod at the second end of the torsion bar, the wires being connected to the first cap and the second cap.

11. The seatbelt retractor of claim 10, wherein the plurality of wires are spaced from each other circumferentially about the axis.

12. The seatbelt retractor of claim 10, wherein connections of the wires to the second cap are weaker than a connection of the wires to the first cap.

13. The seatbelt retractor of claim 10, wherein the wires are bonded to the second cap with an adhesive, the failure strength of the adhesive being less than the failure strength of the wires.

14. The seatbelt retractor of claim 10, wherein the wires and the adhesive are designed so that the adhesive fails when the first end of the torsion bar rotates 0.5 to 1.0 revolutions about the axis relative to the second end.

15. The seatbelt retractor of claim 10, wherein the second cap includes slots receiving the wires, the wires being bonded to the slots with an adhesive, the failure strength of the adhesive being less than the failure strength of the wires.

16. The seatbelt retractor of claim 1, further comprising a webbing supported by the spool.

17. The seatbelt retractor of claim 1, further comprising a locking device supported on the second end of the housing and being operatively engageable with the second end of the torsion bar.

18. The seatbelt retractor of claim 1, wherein the wire and the rod each have a diameter, the diameter of the wire being smaller than the diameter of the rod.

19. A seatbelt retractor comprising:
- a housing having a first end and a second end;
- a spool having a first end and a second end each rotatably supported by the housing, the spool being elongated on an axis from the first end to the second end;
- a torsion bar having a first end fixed to the first end of the spool and a second end operatively engageable with the housing;
- the torsion bar including a wire elongated along the axis and connected to the first end of the torsion bar and the second end of the torsion bar; and
- a connection of the wire to the second end is weaker than a connection of the wire to the first end.

20. A seatbelt retractor comprising:
- a housing having a first end and a second end;
- a spool having a first end and a second end each rotatably supported by the housing, the spool being elongated on an axis from the first end to the second end; and
- a torsion bar having a first end fixed to the first end of the spool and a second end operatively engageable with the housing;
- the torsion bar including a wire elongated along the axis and connected to the first end of the torsion bar and the second end of the torsion bar; and
- the torsion bar including a rod elongated from the first end of the torsion bar to the second end of torsion bar, a first cap connected to the rod at the first end of the torsion bar, and a second cap connected to the rod at the second end of the torsion bar, the wire being connected to the first cap and the second cap.

* * * * *